United States Patent [19]
Miwa et al.

[11] Patent Number: 5,057,464
[45] Date of Patent: Oct. 15, 1991

[54] RADIATION SHIELDING GLASS HAVING AN IMPROVED GAMMA IRRADIATION BROWNING AND DIELECTRIC BREAKDOWN

[75] Inventors: Yoshiharu Miwa; Kazuhiko Asahi, both of Shiga, Japan

[73] Assignee: Nippon Electric Glass Co., Ltd., Otsu, Japan

[21] Appl. No.: 477,735

[22] Filed: Feb. 9, 1990

[30] Foreign Application Priority Data

Feb. 10, 1989 [JP] Japan ................................ 1-32419

[51] Int. Cl.$^5$ .................. C03C 3/06; C03C 3/076; C03C 3/102; C03C 3/108
[52] U.S. Cl. .......................................... 501/53; 501/55; 501/60; 501/61; 501/65
[58] Field of Search .................. 501/62, 64, 60, 61, 501/65; 250/515.1, 519.1; 252/301.6 P, 301.6 F, 301.4 F

[56] References Cited

U.S. PATENT DOCUMENTS

| | | | |
|---|---|---|---|
| 2,782,319 | 2/1957 | McAlpine et al. | 501/64 |
| 2,805,166 | 9/1957 | Löffler | 501/64 |
| 2,856,303 | 10/1958 | Armistead | 501/62 |
| 3,907,584 | 9/1975 | Wada et al. | 501/62 |

OTHER PUBLICATIONS

Kingery et al., Introduction to Ceramics, Second Edition pp. 91–108.

*Primary Examiner*—William R. Dixon, Jr.
*Assistant Examiner*—Michael Marcheschi
*Attorney, Agent, or Firm*—Hopgood, Calimafde, Kalil, Blaustein & Judlowe

[57] ABSTRACT

A radiation shielding glass consisting esentially of 40.0% to 60.0% $SiO_2$, 25.0% to 45.0% of PbO, 1.5% to 2.0% $CeO_2$, 4.5% to 12.0% $Na_2O$, 2.0% to 9.0% $K_2O$, 0% to 5.0% $B_2O_3$, and 0% to 10.0% BaO, $Na_2O/(Na_2O+K_2O)$ being 0.5 to 0.8. The glass has a high radiation shielding capacity and is excellent in a resistance to browning by the gamma ray irradiation and an improved dielectric breakdown. The glass is useful for a window glass of an irradiation room of the gamma ray.

2 Claims, No Drawings

RADIATION SHIELDING GLASS HAVING AN IMPROVED GAMMA IRRADIATION BROWNING AND DIELECTRIC BREAKDOWN

BACKGROUND OF THE INVENTION

The present invention relates to radiation shielding glass of a $SiO_2$-$PbO$-$CeO_2$ type for use as window glass of an irradiation room in an atomic energy research, isotope laboratory, or others.

It is well known that heavy metal such as lead is capable of absorbing or shielding radiation or gamma ray ($\gamma$-ray). Therefore, the $SiO_2$-$PbO$ glass containing a large amount of $PbO$ has a high radiation shielding capacity and can be used for the above-described window glass. However, the glass apts to be browned or darkened by irradiation of radiation ray such as gamma ray so that the light transmittance is more reduced. In order to prevent the browning by irradiation of the radiation ray, it is well known in the prior art that $CeO_2$ is contained in the $SiO_2$-$PbO$ glass.

The use of $CeO_2$ of an increased amount reduces the light transmittance of the glass by the inherent coloring effect of $CeO_2$.

JPB 32-2384 corresponding to U.S. Pat. No. 2,856,303 (Reference 1) issued to Armistead, assigned to Corning Glass Works discloses to use $K_2O$ of 10–25 % by weight in the $SiO_2$-$PbO$-$CeO_2$ glass in order to keep a desired light transmittance under a condition containing $CeO_2$ of a comparatively large amount such as 0.8–1.8% by weight. A part of $K_2O$ can be replaced by other alkaline elements such as $Na_2O$ and $Li_2O$ if a remained $K_2O$ is 10% or more.

On the other hand, when a glass is irradiated by a radiation ray, electrons are charged inside the glass according to the Compton effect to form an electric field in the glass. When intensity of the electric field exceeds the dielectric strength of the glass, the charge is rapidly discharged. As a result, the glass is subjected to danger of cracking and breaking out. $CeO_2$ also has a disadvantage to increase the danger of glass cracking and breaking by the discharge of electrons. The glass cracking and the breaking by the discharge of electrons is called a dielectric breakdown.

JPB 46-2586 (Reference (2)) discloses to use a combination of $Na_2O$ of 4–14% and $K_2O$ of 2–10% by weight (a total amount of $Na_2O$ and $K_2O$ being 6–16%) in the $SiO_2$-$PbO$-$CeO_2$ glass so as to solve the above-mentioned dielectric breakdown even containing the $CeO_2$ of a comparatively large amount such as 0.6–1.4% by weight.

However, browning of the glasses proposed in References (1) and (2) by irradiation of the radiation ray is not sufficiently prevented for increased irradiation of the radiation ray.

If an increased amount of $CeO_2$ is used in order to sufficiently prevent the browning, a resultant glass is subjected to the dielectric breakdown by the electron discharge.

SUMMARY OF THE INVENTION

It is an object of the present invention to provide radiation shielding glass which has a high radiation shielding capacity and a reduced danger of the dielectric breakdown even containing a sufficient and increased amount of $CeO_2$ to defend from browning by the irradiation.

The glass according to the present invention has a limited composition determined from viewpoints of the radiation shielding capacity, non-browning and non-dielectric breaking. The glass contains a predetermined amount of $PbO$ for improving the radiation shielding capacity and $CeO_2$ of an increased amount of 1.5% or more, for example, even a content of 2.0% by weight for defending the glass from browning by irradiation. The glass contains a limited amount of $Na_2O$ and $K_2O$ in a condition that an amount of $Na_2O$ is more than $K_2O$ in order to defend the glass from the dielectric breakdown with a sufficient effect to prevent the browning by irradiation.

According to the present invention, radiation shielding glass is obtained which essentially consists of 40.0% to 60.0% $SiO_2$, 25.0% to 45.0% $PbO$, 1.5% to 2.0% $CeO_2$, 4.5% to 12.0% $Na_2O$, 2.0% to 9.0% $K_2O$, 0% to 5.0% $B_2O_3$, and 0% to 10.0% $BaO$, $Na_2O/(Na_2O+K_2O)$ being 0.5 to 0.8. The glass is provided with a required radiation shielding capacity, a resistance to browning by irradiation and an improved dielectric breakdown.

DESCRIPTION OF THE PREFERRED EMBODIMENT

Description will be made below as to the reason why the amount of each component of the glass of the present invention is limited to the above-mentioned range.

$PbO$ and $SiO_2$ are components which are required for a glass to have radiation shielding capacity as the same extent as that of a structure using the glass as a window glass in the structure.

Radiation shielding capacity is dependent on a density of the glass and a density of the radiation shielding glass is required balance to that of the structure.

Therefore, $SiO_2$ is contained in the glass by 40.0% to 60.0% and $PbO$ is contained by 25.0% to 45.0%. $SiO_2$ less than 40.0% lowers weatherability and the light transmittance of the glass. $SiO_2$ more than 60.0% makes the density too little and reduces the radiation shielding capacity.

In addition, $PbO$ less than 25.0% also reduces the density too low. While, $PbO$ more then 45% considerably increases the volumetric electric resistance and increases danger of the dielectric breakdown.

$CeO_2$ of 1.5% to 2.0% is used to sufficiently prevent the glass from browning. $CeO_2$ less than 1.5% causes no desired browning effect but use of $CeO_2$ more than 2.0% makes the glass yellowish to considerably lower the light transmittance of the glass.

$Na_2O$ and $K_2O$ are contained in the glass as elements from preventing the glass from dielectric breakdown and from browning by irradiation, and 4.5% to 12.0% of $Na_2O$ and 2.0% to 9.0% of $K_2O$ are contained in the glass but $Na_2O/(Na_2O+K_2O)$ should be 0.5 to 0.8. That is, an amount of $Na_2O$ should be larger than $K_2O$.

When $Na_2O$ is less than 4.5% and when $K_2O$ is less than 2.0%, the volumetric electric resistance of the glass is excessively large to thereby increase danger of the dielectric breakdown. On the other hand, more than 12.0% of $Na_2O$ and more than 9.0% of $K_2O$ are not desired because the water resistance of the glass is degraded. In addition, when $Na_2O/(Na_2O+K_2O)$ ratio is less than 0.5, the volumetric electric resistance is lowered to increase the danger of the dielectric breakdown. In detail, 0.25 of $Na_2O/(Na_2O+K_2O)$ ratio makes the volumetric electric resistance maximum. When the ratio is less than 0.2 or more than 0.5, the dielectric breakdown does not occur. On the other hand, when $Na_2O/(Na_2O+K_2O)$ ratio is less than 0.2, browning by γ-ray radiation is increased. Therefore, the ratio should be 0.5 or more. However, when the ratio increases above 0.8, browning by the irradiation is increased.

$B_2O_3$ less than 5% can be added in the glass mainly for regulating its viscosity. BaO can also be added in the glass for regulating the viscosity and for improving the dielectric shielding capacity until the range 10.0%.

$Sb_2O_3$ should not be contained in the glass because addition of $Sb_2O_3$ strengthens the browning by irradiation.

This invention will be described based on examples and comparative examples as follows. Table 1 shows compositions, browning by the gamma ray irradiation, existence of the dielectric breakdown, value of $Na_2O/(Na_2O+K_2O)$ ratio, and density for various sample glass of the present invention and comparative glass samples.

addition, each sample glass was confirmed to have a density balance to a structure using the window glass.

The browning in Table 1 shows a transmittance difference of the sample glass of one centimeter thickness for a light of 590 nm in wavelength before and after irradiation of Co-60 gamma ray by 10 R (Röntgen). The glass was previously optical-polished.

The dielectric breakdown test was carried out by irradiating the optical-polished glass sample of 100 mm cubic by Co-60 gamma ray of $10^6$R and then impacting it by dropping a weight of 730 grams from a height of 38 mm. The test was carried out for five pieces of each sample glass. When the dielectric breakdown was observed in one or more pieces, "exist" of the dielectric breakdown was determined and illustrated in Table 1 for the sample glass. When no dielectric breakdown was not observed in all of five pieces for each sample glass, "not" was marked for the dielectric breakdown of the glass.

TABLE 1

| Composition | Sample No. | | | | | | | | | |
|---|---|---|---|---|---|---|---|---|---|---|
| | 1 | 2 | 3 | 4 | 5 | 6 | 7 | 8 | 9 | 10 |
| $SiO_2$ | 48.0 | 53.0 | 49.0 | 45.9 | 46.4 | 50.2 | 53.7 | 52.9 | 53.0 | 53.4 |
| PbO | 37.5 | 32.0 | 28.0 | 41.5 | 33.0 | 33.5 | 32.0 | 31.7 | 31.0 | 30.0 |
| $CeO_2$ | 1.5 | 1.9 | 1.5 | 1.6 | 1.6 | 1.8 | 1.2 | 1.8 | 1.5 | 1.4 |
| $Na_2O$ | 10.0 | 7.1 | 8.5 | 5.0 | 10.8 | 7.0 | 7.1 | 6.0 | 3.0 | 0.2 |
| $K_2O$ | 3.0 | 6.0 | 5.0 | 3.0 | 8.2 | 6.5 | 6.0 | 7.6 | 11.0 | 14.0 |
| $B_2O_3$ | — | — | — | 3.0 | — | — | — | — | 0.5 | 1.0 |
| BaO | — | — | 8.0 | — | — | — | — | — | — | — |
| browning | 8.2 | 5.8 | 7.0 | 9.7 | 3.8 | 6.8 | 21.3 | 5.8 | 2.9 | 17.3 |
| exist or not exist of dielectric breakdown | not | not | not | not | not | not | not | exist | exist | not |
| $Na_2O/(Na_2O + K_2O)$ | 0.77 | 0.54 | 0.63 | 0.63 | 0.57 | 0.52 | 0.54 | 0.44 | 0.21 | 0.01 |
| density | 3.39 | 3.23 | 3.23 | 3.49 | 3.24 | 3.24 | 3.23 | 3.22 | 3.21 | 3.20 |

Nos. 1 to 10 sample glasses are prepared as follows. To begin with, a glass batch of each of Nos. 1 to 10 in Table 1 was prepared and was set in a Pt crucible and melted at 1440° C. for 4 hours. In order to obtain homologous glasses, the molten glass was stirred by a Pt stirring stick to remove bubbles and flowed out into a cavity to form a sample glass. The sample glass. The sample glass obtained was subjected to tests for investigation of the browning by irradiation, the dielectric breakdown, and the density.

As a result, Nos. 1 to 6 sample glasses of the present invention were less in the browning by irradiation of the gamma ray and have no danger of the dielectric breakdown. No. 7 comparative sample glass according to Reference (2) was considerably browned by the gamma ray irradiation on account of less contents of $CeO_2$. Nos. 8-9 comparative sample glasses were subjected to the dielectric breakdown. This is because the value of $Na_2O/(Na_2O+K_2O)$ is not more than 0.5 but is 0.44. In In addition, the density was measured by the well-known Archimedes method.

As a result, the radiation shielding glass according to the present invention fulfills the required radiation shield capacity, and is excellent in the browning by irradiation and the dielectric breakdown. Therefore, the glass of the present invention is useful for a window glass of an irradiation room of the radiation ray.

What is claimed is:

1. A radiation shielding glass composition having a high radiation shielding capacity, a high resistance to browning by irradiation of gamma ray, and a reduced dielectric breakdown, said composition consisting essentially of 40.0% to 60.0% $SiO_2$, 25.0% to 45.0% PbO, 1.5% to 2.0% $CeO_2$, 4.5% to 12.0% $Na_2O$, 2.0% to 9.0% $K_2O$, 0% to 5.0% $B_2O_3$, and 0% to 10.0% BaO, $Na_2O/(Na_2O+K_2O)$ being 0.5 to 0.8.

2. A radiation shielding glass as claimed in claim 1, wherein $(Na_2O+K_2O)$ is 16 or more.

* * * * *